United States Patent
Rantanen

(10) Patent No.: US 8,171,008 B2
(45) Date of Patent: May 1, 2012

(54) DATA RETRIEVAL

(75) Inventor: Teemu Rantanen, Helsinki (FI)

(73) Assignee: Tekla Corporation, Espoo (FI)

( * ) Notice: Subject to any disclaimer, the term of this patent is extended or adjusted under 35 U.S.C. 154(b) by 440 days.

(21) Appl. No.: 12/248,280

(22) Filed: Oct. 9, 2008

(65) Prior Publication Data

US 2009/0313223 A1 Dec. 17, 2009

(30) Foreign Application Priority Data

Jun. 17, 2008 (FI) .................................... 20085597

(51) Int. Cl.
*G06F 7/00* (2006.01)
*G06F 17/00* (2006.01)
(52) U.S. Cl. ...................................... 707/706; 707/770
(58) Field of Classification Search .......... 707/600–831; 709/217, 219
See application file for complete search history.

(56) References Cited

U.S. PATENT DOCUMENTS

| | | | |
|---|---|---|---|
| 6,638,314 B1 | 10/2003 | Meyerzon et al. | |
| 6,763,351 B1 * | 7/2004 | Subramaniam et al. | 1/1 |
| 6,766,315 B1 | 7/2004 | Bratsos et al. | |
| 7,124,127 B2 * | 10/2006 | Sakamoto et al. | 707/722 |
| 7,428,573 B2 | 9/2008 | McCanne et al. | |
| 2004/0088376 A1 * | 5/2004 | McCanne et al. | 709/219 |
| 2008/0147601 A1 * | 6/2008 | Chapus et al. | 707/3 |

OTHER PUBLICATIONS

Nguyen et al., Mining Search-Phrase Definitions from Item Descriptions, Apr. 7-12, 2008, IEEE, 1346-1348.*

Housel, B.C. et al., Web*Express*: A client/intercept based system for optimizing Web browsing in a wireless environment. *Mobile Networks and Applications*, Tammikuu 1998, vol. 3, No. 4, pp. 419-431.

* cited by examiner

*Primary Examiner* — Jean B Fleurantin

(74) *Attorney, Agent, or Firm* — Young & Thompson

(57) ABSTRACT

To facilitate obtaining up-to-date data over a slow connection, reference search results are stored on a requesting side and on a responding side, and only changes to reference searches are transmitted. To achieve this, the requesting side indicates in a data request an applicable reference search or reference searches to be used, and the responding side retrieves up-to-date data, compares it with search results of corresponding applicable reference search(es) and sends only changes to the requesting side.

18 Claims, 6 Drawing Sheets

DATA RETRIEVAL

FIELD

The invention relates to retrieving data from a data storage.

BACKGROUND

The evolvement of communication, technology, particularly wireless communication technology and end user terminals, has increased the use of data retrievals in field conditions. A problem associated with data retrieval in field conditions is that when a data transmission link is a slow one, data transmission may take a lot of time, especially if a big amount of data is retrieved.

US 2006/0069719 discloses a solution in which data is segmented, and data segments are stored on a server-side and a client-side. In US 2006/0069719 a server sends references to segments to a client in response to a data request, and the client obtains the referred segments from its memory. If the client receives from a server an unknown reference, the client requests the data in the referred segment and receives the data from the server. When data changes in the server, the server creates a new segment, sends its reference, other bindings and the data itself in a response to the client. A problem with the solution is that if data is updated fragmentarily, this will most probably end up in a situation in which, instead of sending references to segments, new segments are created and segment references, their bindings and the data as a whole are sent, thereby resulting in a bigger amount of data sent than in a situation in which no segmentation is used but only data is sent.

SUMMARY

An object of the present invention is to minimize the amount of information transmitted from a data storage and yet to provide a data retriever with an up-to-date version of data searched. The object of the invention is achieved by methods, apparatuses, a computer program product and a system which are characterized by what is stated in the independent claims. The preferred embodiments of the invention are disclosed in the dependent claims.

The invention is based on realizing the problem and utilizing stored reference search results on a requesting side and on a responding side, the requesting side indicating in a request a reference search or reference searches to be used, and the responding side transmitting only changes to search results of corresponding reference search(es), thereby reducing the amount of transmitted information. This has an advantage that the data retriever receives the up-to-date version of the searched data but, since only changes are transmitted, the amount of data to be transmitted is smaller and thereby the data transmission is faster. This advantage is emphasized with slow data transmission links. Another advantage is that by indicating the reference searches in the request, the responding side knows which reference searches stored on the responding side can be used, whereby further requests are avoided, and there is no need for both the responding side and the requesting side to contain the whole data of a database. In other words, there is no need to have a replicate of the whole data storage in the client.

LIST OF DRAWINGS

Embodiments of the present invention are described below, by way of example only, with reference to the accompanying drawings, in which FIG. 1 shows the general architecture of a communication system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any data retrieval apparatus, corresponding component(s), and/or to any data storage system or any combination of different data storage systems, such as a client—server structure or any corresponding structure. The methods and processes used, the specifications of data storage and/or retrieval systems, methods and algorithms are developing. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on a client—server structure, without restricting the embodiment to such an architecture, however.

Figure 1:
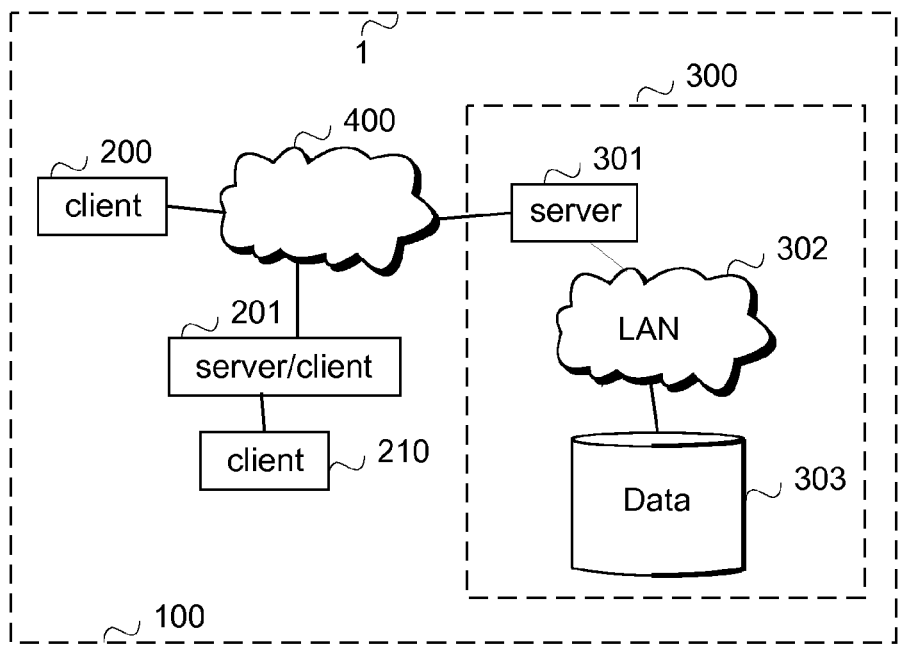

A general architecture according to an embodiment is illustrated in FIG. 1. FIG. 1 is a highly simplified system architecture only showing some elements, networks and functional entities, all being logical units whose implementation may differ from what is shown. The connections shown in FIG. 1 are examples of logical connections; the actual physical connections may be different. It is apparent to a person skilled in the art that the systems also comprise other functions and structures. It should be appreciated that the functions, structures, elements and the protocols used in or for data information exchange, for data compression, for detecting changes (i.e. difference searches) and indications, and for actual communication are irrelevant to the actual invention. Therefore, they need not be discussed in more detail here.

The system 100 illustrated in FIG. 1 comprises one or more apparatuses 200, 201, 210 as clients, connected to a server system 300 over a network 400. Examples of the network 400 include a mobile network, a public switched telephone network, a wide area network WAN, Internet, and a local area network LAN.

Figure 2:
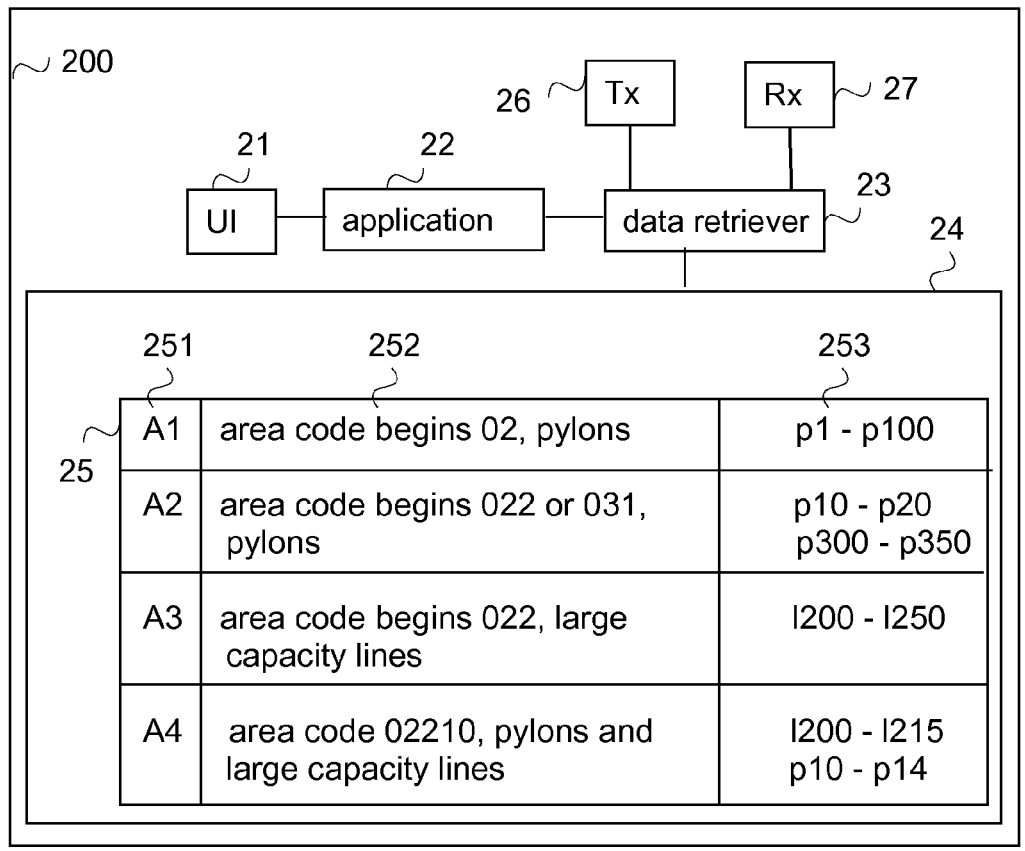
FIGS. 2 and 3 are simplified block diagrams of apparatuses according to an embodiment.

An apparatus 200, described in more detail with references to FIG. 2, may be any user terminal or work station, such as a laptop, at mobile phone, a personal computer, a field device, or a personal digital assistant (PDA). Further, the apparatus 201 may be a server to which end user terminals 210 or other servers are connected, and which is connected over a slow connection, for example, to a further server in the server system, either directly or via a network (as illustrated in FIG. 1). In other words, the apparatus 200, 201 may act as a client towards the server system and as a server towards other apparatuses.

In the embodiment of FIG. 1, the server system 300 comprises a server node 301 connected over a local area network LAN 302 to a data storage 303. In other embodiments, the server node functionality and data storage may be integrated in an apparatus, or connected to each other over wide area network, for example.

Figure 3:
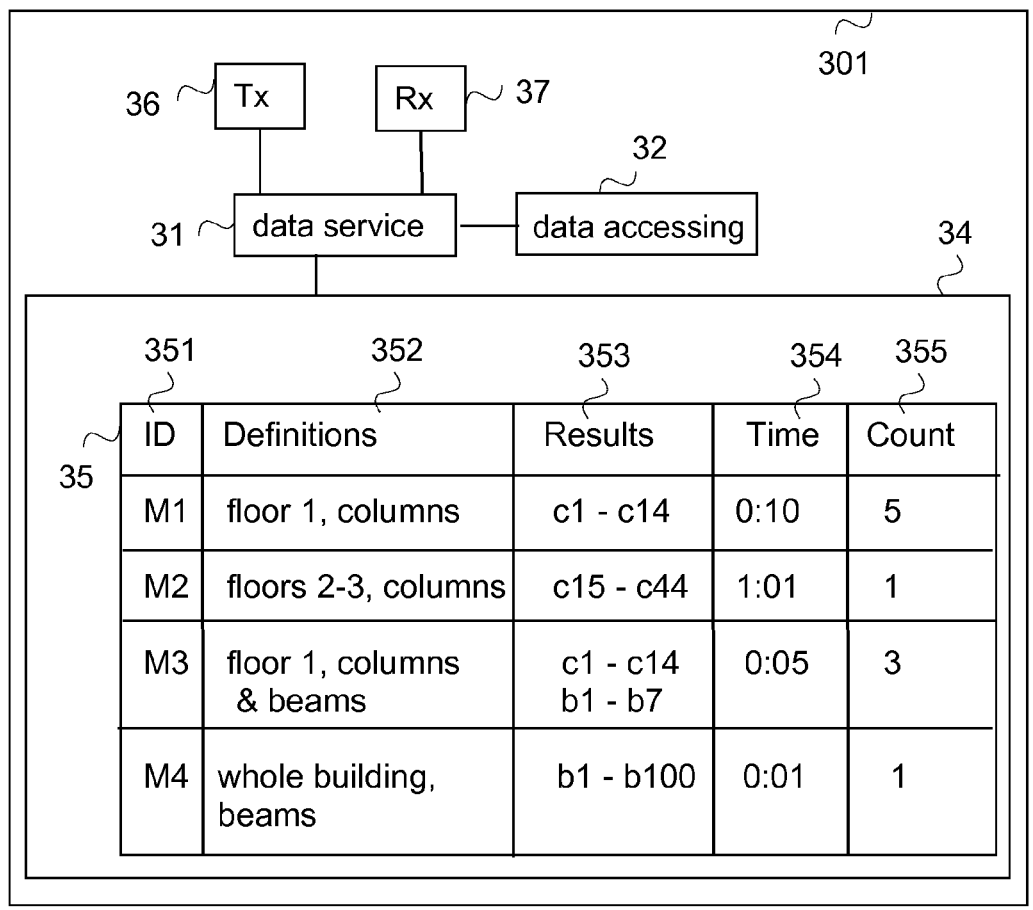

A server node 301, described in more detail with FIG. 3, may be any computing apparatus, such as a computer that is configured to perform at least a part of database service functionality, thereby being part of a database management system.

The data storage 303 may be any kind of conventional or future data storage including distributed and centralized data storages. The data storage may be a memory, a file server comprising the memory and being configured to retrieve data, or a data management server comprising the memory and being configured to retrieve data and to perform computation on the data. The data storage may comprise data stored as records, files, tables, objects, binary data, etc., and the data storage may be organized as a relational-oriented or object-oriented database, for example. However, the implementation of the data storage and the way how the data is stored and updated bear no significance to the invention and need not be described in detail here.

FIG. 2 is a simplified block diagram of a requesting apparatus, such as a user terminal, according to an embodiment. Below, the apparatus is called, for the sake of clarity, a user terminal. Although the user terminal has been depicted as one entity, different modules and memory may be implemented in one or more physical or logical entities.

The user terminal 200 is configured to provide its user with information the user is interested in. For this purpose, the user terminal comprises a user interface unit 21 for receiving user inputs via different input devices (a keyboard, a pointing device, for example) and for outputting different information to the user via different output devices (a display, a printer, for example); one or more applications 22 the user may use for outputting and/or for searching information; a data retriever unit 23 for performing data searches, i.e. data retrievals, as will be described below; memory 24 for storing reference searches 25; a transmitter 26 for sending data search requests; and a receiver 27 for receiving responses to data search requests, the transmitter and the receiver being part of a network interface. In addition to or instead of the user interface, the user terminal may have an interface unit or units for input/output devices, such as a GPS (global positioning system) device, which may provide, without user interaction, information that triggers an application to request data. The units may be operatively coupled to each other.

Each reference search stored to the memory comprises an identifier 251, search definitions 252 (also called search criteria), and search results 253. The identifier may be any identifier identifying unambiguously a corresponding reference search also in the server system. Examples of such an identifier include a digital signature; a checksum or a hash calculated, for example, from the search results, from the search definitions, or from a combination of the search results and the search definition; and a running number, possibly combined with a user terminal's address. If the identifier is calculated from the other information stored to the reference search, storing it as part of the reference search is not necessary; instead it may be calculated when needed (see FIG. 4). A combination of search definitions and a time stamp indicating the time the search was performed at may also be used as an identifier. A reference search may comprise also other information, such as a time stamp indicating when the search result was stored, and a time stamp indicating when the reference search was fast used. Search results of different reference searches may overlap, and a reference search may be a subset of another reference search or contain subsets of two or more other reference searches. The memory 24 may be removable memory detachably connected to the user terminal and any method for storing reference searches may be used.

Different examples of the functionality of the user terminal, or more precisely, of a functionality of the data retrieving unit 23, are described in more detail below with FIGS. 4, 6 and 7. It should be appreciated that the user terminal, or any other corresponding data requesting apparatus, may comprise other units used in or for providing a user with information. However, they are irrelevant to the actual invention and, therefore, they need not to be discussed in more detail here.

FIG. 3 is a simplified block diagram of an apparatus sending responses to requests, such as a server node, according to an embodiment. Below, the apparatus is called, for the sake of clarity, a server. Although the server has been depicted as one entity, different modules and memory may be implemented in one or more physical or logical entities.

The server 301 is configured to provide its clients with information the client requested. For this purpose, the server comprises a receiving unit 31 for receiving requests, responses and other inputs; a data accessing unit 32 for accessing a data storage, the data accessing unit comprising a data storage interface unit; a data service unit 33 for performing data searches, i.e. data retrievals, as will be described below; memory 34 for storing reference searches 35 and a transmitting unit 36 for sending request, responses and other outputs. The units may be operatively coupled to each other.

Also in the server, each reference search comprises preferably at least search definitions 352, search results 353, and an identifier 351, as described above. However, on the server side, one reference search may comprise at its simplest only search results, assuming that the identifier is calculated from the search results. A reference search may comprise also other information, such as a time stamp indicating when the search result was stored, a time stamp 354 indicating when the reference search was last used, and/or counter information 355 indicating how many times the reference search has been used, for example. Thus, a reference search in a user terminal and a corresponding reference search in the server may contain different information. It suffices that the search results are the same and corresponding reference searches can be found. Search results of different reference searches may overlap, and a reference search may be a subset of another reference search or may contain one or more subsets of one or more other reference searches. The reference searches may be stored client-specifically and/or to be common to clients. The memory 34 may be removable memory detachably connected to the server and any method for storing reference searches may be used.

Different examples of the functionality of the server, or more precisely, a functionality of the data service unit 33, are described in more detail below with FIGS. 5, 6 and 7. It should be appreciated that the server may comprise other units used in or for providing a user with information. However, they are irrelevant to the actual invention and, therefore, they need not to be discussed in more detail here.

An apparatus, such as a user terminal or server, or a corresponding component, implementing one or more functions of a corresponding user terminal or server described with an embodiment comprises not only prior art means but also means for implementing the one or more functions of a corresponding apparatus described with an embodiment and it may comprise separate means for each separate function, or means may be configured to perform two or more functions. The apparatus may be configured as a computer or a microprocessor, such as a single-chip computer element, including at least a memory for providing storage area used for arithmetic operation and for reference searches and an operation processor for executing the arithmetic operation. Present apparatuses comprise processors and memory that can be utilized when implementing an embodiment. The memory, or part of it, may be removable memory detachably connected to the server. For example, a data retriever unit or a data service unit may be a software application, a module, or a unit configured as arithmetic operation or as a program (including an added or updated software routine), executed by an operation processor, such as a central processing unit. An embodiment provides a computer program embodied on any apparatus-readable distribution/data storage medium, comprising program instructions which, when loaded into an apparatus, constitute the unit. Programs, also called program products, including software routines, applets and macros, can be stored in any medium to form an article of manufacture, and may be downloaded into the apparatus. In other words, all modifications and configurations required for implementing one or more functions of an embodiment may be implemented as added or updated software routines, application circuits (ASIC) and/or programmable circuits.

Figure 4:
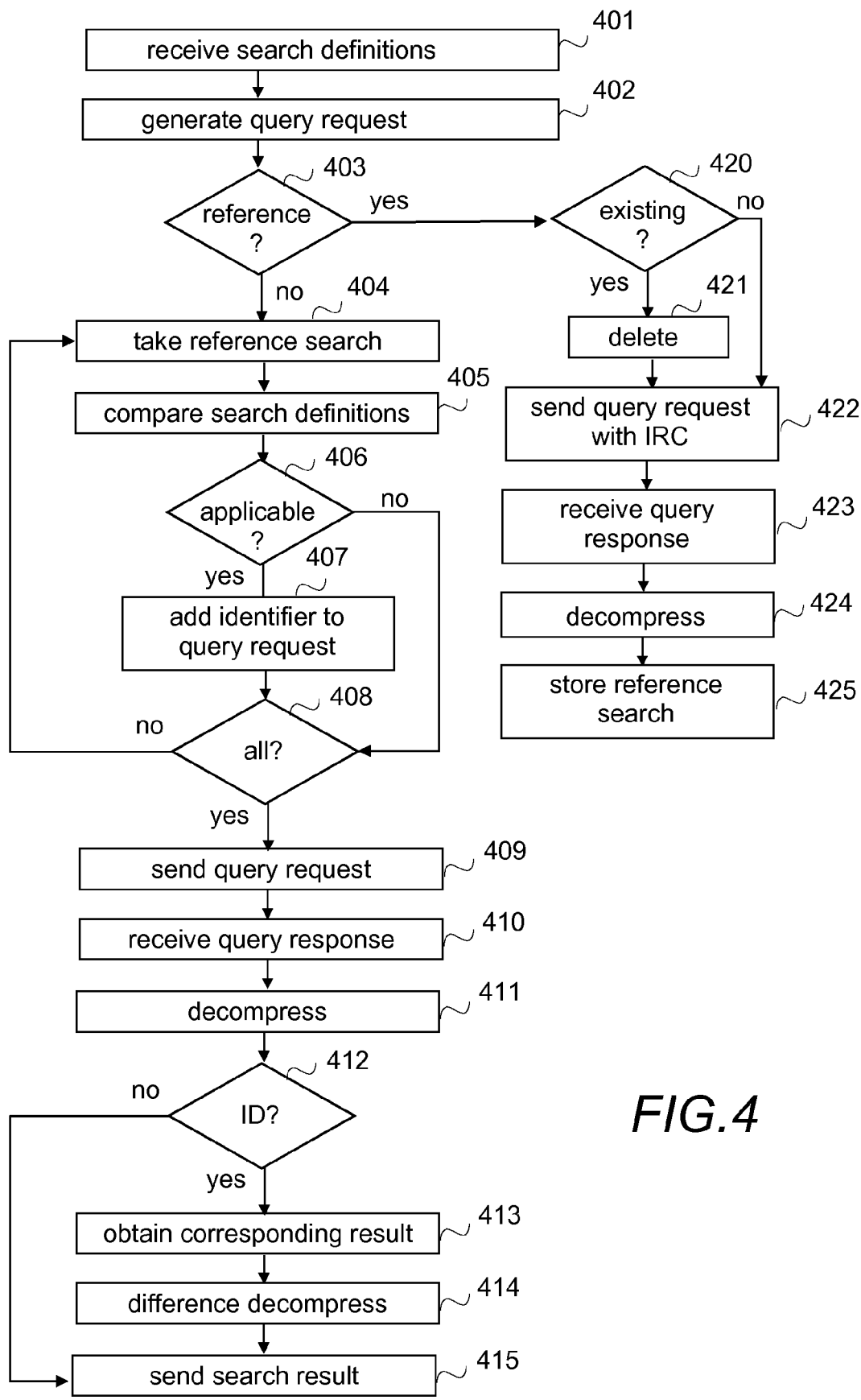
FIGS. 4 and 5 are flow charts illustrating functionalities of apparatuses according to an embodiment.

FIG. 4 illustrates functionality of a user terminal according to an embodiment. In the embodiment it is assumed that reference searches are updated and/or added separately on a user's request, and the user terminal contains either a specific application unit for adding and updating reference searches or an application unit used for conventional searches is configured to manage reference searches as well. A further assumption is that only one search result is received in the query response.

FIG. 4 starts when the data retriever unit receives, in step 401, from an application unit a search request containing search definitions and, in response to the search request, generates, in step 402, a query request containing the search definitions. Then the data retriever unit checks, in step 403, whether or not the search request is for adding or updating a reference search. Depending on an implementation, the search request may contain an indication from which it is deducible, or it may be deduced on the basis of the application unit sending the search request.

If the search request is not for adding or updating a reference search (step 403), the data retriever unit starts to examine the reference searches stored in the memory by taking, in step 404, a reference search and by comparing, in step 405, the received search definitions with search definitions in the reference search. If the comparison indicates that the reference search is applicable (step 406), the data retriever unit, adds, in step 407, the reference search's identifier to the query request and then checks, in step 408, whether or not all reference searches have been examined. If the comparison indicates that the reference search is not applicable (step 406), the process continues in step 408 by checking whether or not all reference searches have been examined. If not, then the process returns to step 404 to take another reference search. If all reference searches are examined (step 408), the query request is sent in step 409. The query request contains, in addition to the search definitions, reference search identifiers of applicable reference searches. However, it may happen that no applicable reference search exists, in which case the query request does not contain any reference search identifiers.

An algorithm with which it is decided whether or not a reference search is an applicable one may be freely defined. Examples of algorithms include the following alternatives based on overlapping search definitions (overlapping covers the same, superset, subset and partially different):

received search definitions are the same as the reference search's search definitions;

received search definitions are a subset of the reference search's search definitions, the size/coverage of the subset having either no limitations or a limitation; for example, the size/coverage of the subset must be at least 5% or 76% of the reference search size/coverage;

received search definitions are a superset of one or more reference searches;

received search definitions overlap reference search's search definitions by a predefined amount, such as 85%, 97%, 55%, or 33%;

a combination of the previous two (subset and overlap), such as overlap at least 70% and size at least 35%;

a combination of one of the above and an age condition relating to the reference search.

Then a query response is received, in step 410, and decompressed in step 411. If the query response contains an identifier (step 412), the data retriever unit detects that the query response contains changes (differences) to a reference search having the identifier, and obtains, in step 413, search results of the reference search from the memory, and difference-decompresses, in step 414, the obtained search results with the received changes. The changes may include new data, indication(s) of removed data, and updated data. The difference decompression automatically takes care of the result being according to the search definitions. (For example, if the search definitions define a subset of a reference search, the search results not belonging to the subset may be indicated as removed.) Then the data retriever unit sends, in step 415, the search result to the application unit from which the search definitions were received in step 401.

If the query response does not contain an identifier (step 412), the query response contained the search results, and the process continues from step 415 by sending the search result.

If the search request is for a reference search (step 403), the data retrieval unit checks, in step 420, using the search definitions, whether the reference search is an update to an existing search or a new one. If it is for updating an existing search, the data retrieval unit deletes, in step 421, the existing reference search from the memory, and sends, in step 422, the query request with an indication of reference search (IRC). If the search request is for a new reference search (step 420), the data retriever unit skips over step 421 and continues in step 422 by sending the query request.

When the data retriever unit receives, in step 423, a query response to the request sent in step 422, it decompresses, in step 424, the received response and stores, in step 425, the response with the search definitions received in step 401 as a reference search.

Although in the above it is assumed that reference searches are updated and/or added on user's specific requests, it should be understood that in addition or instead, some other mechanism might be used. For example, the reference searches may be predefined by an application utilizing them and/or the reference searches may comprise time information, or contain a certain update-interval information, which may trigger the updating of the reference search(es) without user interaction. However, when an update is triggered without user interaction, a permission to perform the update may be requested from a user.

In another embodiment, the user terminal is configured, in response to the number of applicable reference searches being bigger than a preset threshold value, for example, more than five reference searches, to evaluate applicable reference searches and to send in a query request only one (or some other predefined number) of reference searches selected on the basis of the evaluation.

Figure 5:
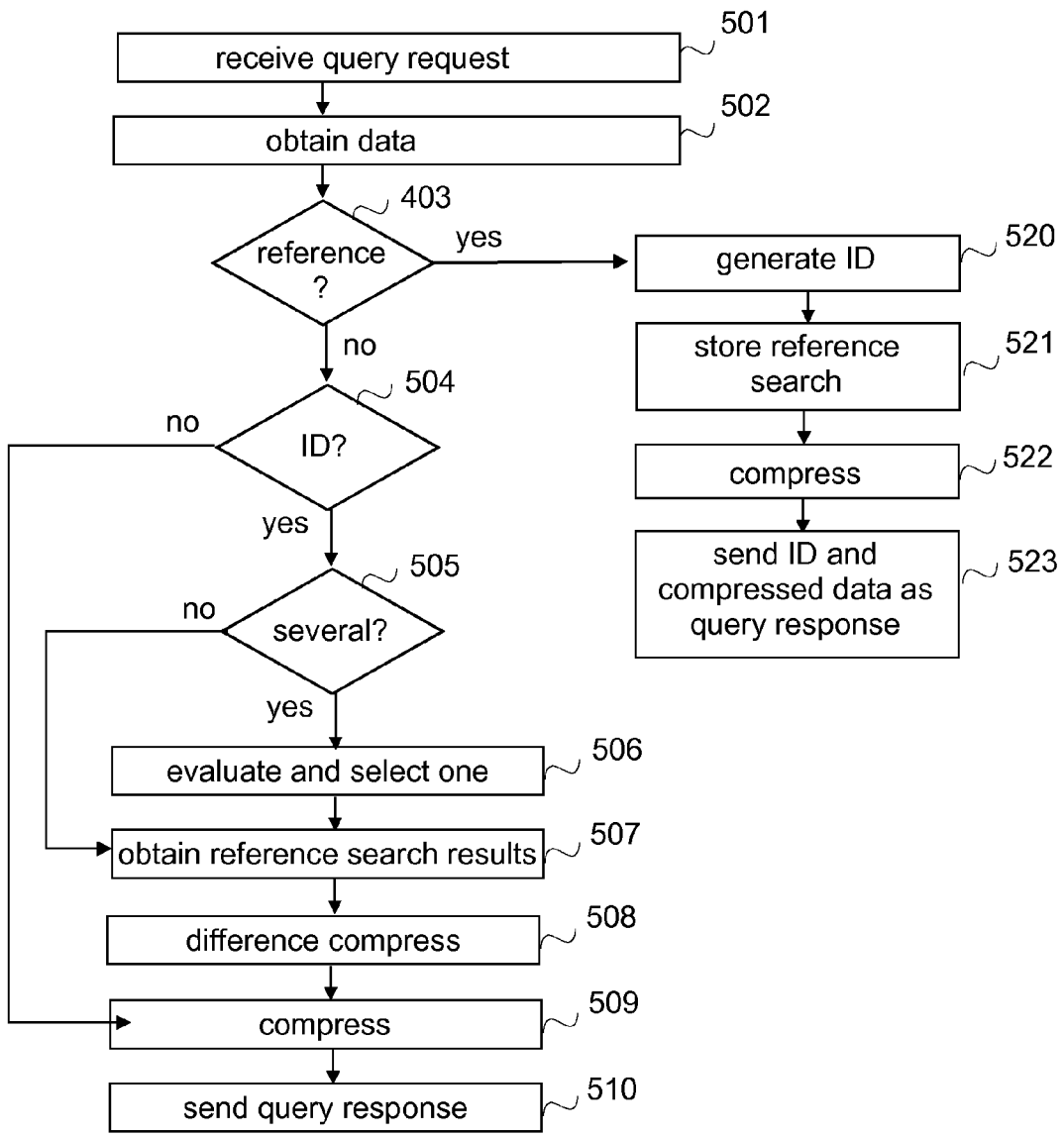

FIG. 5 illustrates functionality of a server usable with a user terminal according to the embodiment described with reference to FIG. 4. FIG. 5 starts when the server receives, in step 501, a query request. In response to the request, the server obtains, in step 502, from a data storage, data fulfilling the search definitions obtained in the query request.

If there was no indication of adding or updating a reference search in the query request (step 503), it is checked whether or not the query request contained any reference search identifiers (steps 504 and 505) and if it contained more than one reference search identifiers, the server evaluates, in step 506, the reference searches and selects, in step 506, using predefined selection rules, one of them to be processed. An example of the predefined selection rules includes that the reference search with the smallest amount of data, the amount being defined by the search definitions, is selected, and if there are several search definitions defining the same amount, the one listed first is selected. It should be appreciated that the invention does not restrict the number of selected reference searches and/or the content of the selection rules, and that any number, predefined or depending on the rules, and/or selection rule may be used. The server may, for example, maintain information on when the reference search was updated and to select the most recent one, or store the size of the last difference compression to the reference search and use it as a criterion or one of the criteria. Further, the server may be configured to difference-compress, as a background operation, reference searches to each other, to perform database searches by using a specific search definition and to compare which of the reference searches is the best one for the used search definition.

When a reference search identifier is selected, or if the request contained only one identifier, a corresponding reference search results are obtained, in step 507, and the data obtained in step 502 is difference-compressed, in step 508, upon the search result in the reference search. Then a query response is formed, in step 509, by compressing the result of the difference compression and the corresponding identifier to be the query response. Then the query response is sent in step 510.

If the query request did not contain any reference search identifiers (step 504), the obtained data is compressed, in step 509, to be a query response. Then the query response is sent in step 510.

If the query request was for adding or updating a reference search (step 503), the data retrieval unit generates, in step, 520, an identifier for the reference search, and stores, in step 521, the reference search to the memory, the stored reference search comprising preferably the identifier, search definitions and the obtained data. Then the server compresses, in step 522, the data and sends, in step 523, the identifier and the compressed data as a query response. In the embodiment, it is assumed that the user terminal knows for which search definitions a response is waited for. However, the query response may also contain the search definitions. Further, in an embodiment where the identifier is calculated from the data and the user terminal is also configured to perform the calculation, the query response does not contain the identifier.

It should be appreciated that a query request for reference searches may contain several reference searches, in which case each reference search is updated performing steps 520-522 and possibly also the sending step several times.

In another embodiment, in which references searches are maintained client-specifically (user-terminal-specifically), the server deletes an existing search if the search request is for a reference search (i.e. after step 503 and before step 520).

In further embodiments of the invention, the server obtains reference search results for each reference search identifier and performs the difference compression for each of them, and depending on the implementation sends all of them as a query response or selects one of them, for example, the smallest one after difference compression, to be a query response. In an implementation of the latter embodiment, also the data obtained in step 502 may be compressed and taken as one candidate for the selection procedure (e.g. the size comparison).

Compression and difference compression can be performed with any algorithm capable of performing such compressions. An example includes vcdiff, i.e. an IETF Internet standard for generic differencing and compression data format described in RFC 3284, which is incorporated herein as a reference.

In another embodiment, there is no specific search reference adding or updating indication but all responses are stored as reference searches. In the embodiment, step 403 in FIG. 4 is skipped over and the process continues from step 404, and after the response is decompressed and possibly updated (i.e. before or during step 415), a reference search is stored (correspondingly to step 425), and steps 420-425 are omitted. Correspondingly, in FIG. 5, step 503 is omitted, and the process continues from step 504, and steps corresponding to steps 520 and 521 are performed before/during reference search results are compressed/difference-compressed.

In a further embodiment, based on the above (i.e. there is no specific search reference adding or updating indication), the user terminal stores some responses as reference searches and the server stores all responses as reference searches. The user terminal may be configured to maintain information on how often specific search definitions are used, and use that information to decide which search results are stored as the reference search. Another criterion for selecting a reference search may be the size of a response. The user terminal may also be configured to store every second search or not to store every fifth search, for example.

In another embodiment of the invention, the user terminal stores some responses as reference searches, and the server stores the same reference searches. In the embodiment, when a data search is to be stored as a reference search, the user terminal sends an indication in a query, the indication indicating that search results of this specific search will be stored, and then the user terminal processes a query response according to steps 411-415 and further stores the search results (the ones sent in step 415) as a reference search. Correspondingly, the server is configured to perform steps 505-510 and then further step 521 in response to a query request containing the indication.

In some embodiments, a reference search is applicable only if it has the same search definitions that the data retriever unit receives, in step 401. In such an embodiment, if an applicable reference search exists, a query request contains only the reference search's identifier, and the server is configured to store with a reference search also search definitions used in the reference search, and in response a received query request containing an identifier, to obtain the search definitions and to use them when obtaining data from the data storage.

In other embodiments no identifiers are used and a query request contains search definitions but no reference search identifier. In the embodiment, the server is preferably configured to store reference searches requester-specifically, and/or the reference searches in the client and in the server may be updated in a centralized manner, so that applicable reference searches are obtainable. It may also be that two types of query requests are used: a first type for sending search definitions when a client finds one or more applicable reference searches, and a second type of query request for sending search definitions when no applicable reference search exits FIG. 6 is a chart illustrating data retrieval according to an embodiment. In the embodiment it is assumed that search definitions need to be an exact match of a reference search or an exact combination of reference searches. In the following example it is assumed, for the sake of clarity, that there is an exact match of a reference search.

Figure 6:
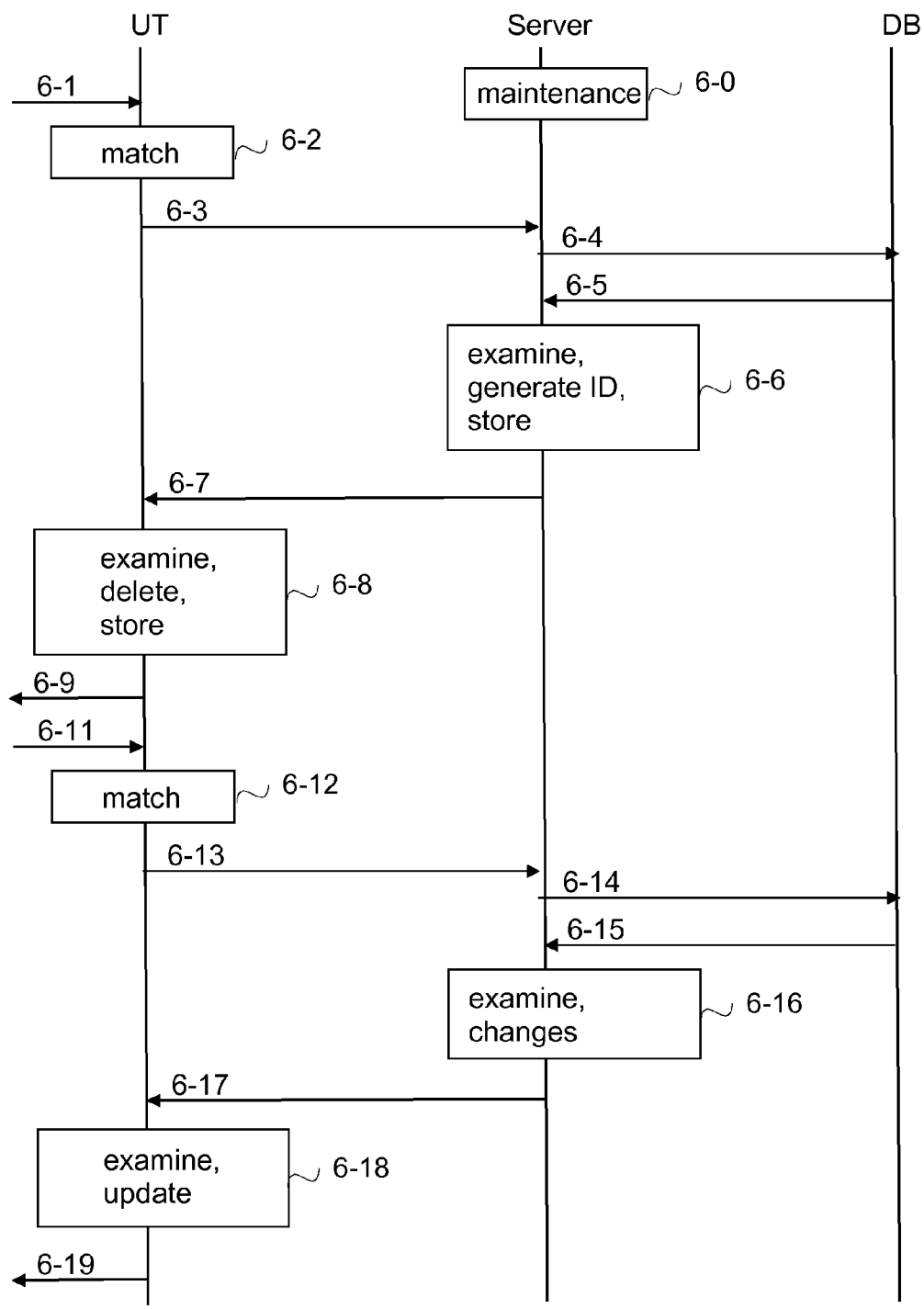
FIGS. 6 and 7 illustrate data retrievals according to other embodiments.

In the embodiment illustrated in FIG. 6, the server is configured to perform maintenance actions 6-0 as a background procedure. The maintenance actions may include performing test difference compressions for stored reference searches by using the search definitions, and if the size of the (compressed) difference compressions is almost the same as or bigger than the size of the up-to-date version of the corresponding data after compression, deleting the reference search. Other reasons for deletion may be that the reference search is too old, not used in a long time, used rarely, etc. The maintenance in the embodiment is stateless. An advantage of the maintenance is that a reference search containing search results that are mainly out-of-date will be deleted and the up-to-date version will be sent without difference compression, thereby reducing the usage of a computation capacity.

In response to a user terminal UT receiving search definitions in message 6-1, the user terminal examines reference searches in its memory and finds, in point 6-2, a match. In other words, a search reference with the same search definition exists. Therefore the UT sends a query request 6-3 with the search definitions and an identifier of the search reference.

In response to receiving a query request 6-3, the server performs, using the received search definitions, data retrieval from a data storage DB (messages 6-4, 6-5) and examines, in point 6-6, reference searches using the identifier. This time no such reference search is found, since it has been deleted during maintenance. Therefore the server generates, in point 6-6, an identifier and stores, in point 6-6, the retrieved data with search definitions and the identifier to the memory containing reference searches. Since no reference search is found, no changes can be determined and the server sends the retrieved data, preferably after compressing it, with the identifier in a query response 6-7 to the user terminal.

When the user terminal receives the query response with an identifier 6-7, it examines, in point 6-8, its reference searches to find a reference search having the same identifier. However, since the identifier was generated in point 6-6, no corresponding identifier is found. Therefore the user terminal examines the reference searches to find out whether the same definitions (the user terminal waited for a query response to the definitions, so it knows them) are found in a stored reference search, and if they are, deletes, in point 6-8, the existing reference search. Then the user terminal stores, in point 6-8, the received results, search definitions and the identifier as a new reference search and sends the search result as a response in message 6-9.

After a while the user terminal UT receives the same search definitions in message 6-11 and examines reference searches in its memory. A match is found (point 6-12). Therefore the UT sends a query request 6-13 with the search definitions and an identifier of the search reference.

In response to receiving a query request 6-13, the server performs, using the received search definitions, data retrieval from a data storage DB (messages 6-14, 6-15) and examines, in point 6-16, reference searches by using the identifier. This time a match is found and the server calculates, in point 6-16, changes by comparing the retrieved data with the search results in the reference search. When the changes are calculated, the server sends the changes in a query response 6-17 to the user terminal. If the data has not been updated between the two retrievals, the query response 6-17 contains only the identifier.

When the user terminal receives the query response 6-17, it examines, in point 6-18, whether a corresponding identifier is found. This time a corresponding identifier is found. Therefore the user terminal obtains the search results in the reference search having the identifier and updates the search results with the changes in point 6-18, and then sends the search result as a response in message 6-19. However, the stored reference search results are not updated in order to ensure that the reference search results are the same in the server and in the user terminal. If the query response 6-17 contains only the identifier, updating is skipped over.

An advantage of the maintenance 6-0 in embodiments where the server selects from among the received reference searches the most usable one or the most usable ones is that the maintenance facilitates the selection.

Another advantage illustrated especially by FIG. 6 is that neither the client nor the server needs to know which reference searches are stored on the other side, and the requested information will be delivered with minimum information exchange.

As said above, the embodiment illustrated in FIG. 6 has the advantage that the server side may be configured to take care of updating reference searches by deleting them automatically from server's memory. If the reason for deletion is the number of changes compared to the search results of the reference search, comparison and deletion may be performed in point 6-16.

In another embodiment, in which query responses contain no identifier or identifiers when a corresponding search is found in the server, the user terminal is configured to detect a reference search to be stored in response to receiving a query response with an identifier.

In another embodiment, each query request not containing an identifier is interpreted in a user terminal and in a server to be for a search, the results of which are to be stored as a reference search, whereas a query request with an identifier is interpreted to mean merely a data search.

In a further embodiment, the server and/or the user terminal maintains information on search definitions not having an exact match in the reference searches and on how often the search definitions are used, and in response to the search definitions being used at least to a certain extent, preferably within a period, the server or the user terminal triggers reference search update/adding to add a reference search corresponding to the search definition to be a reference search.

Figure 7:
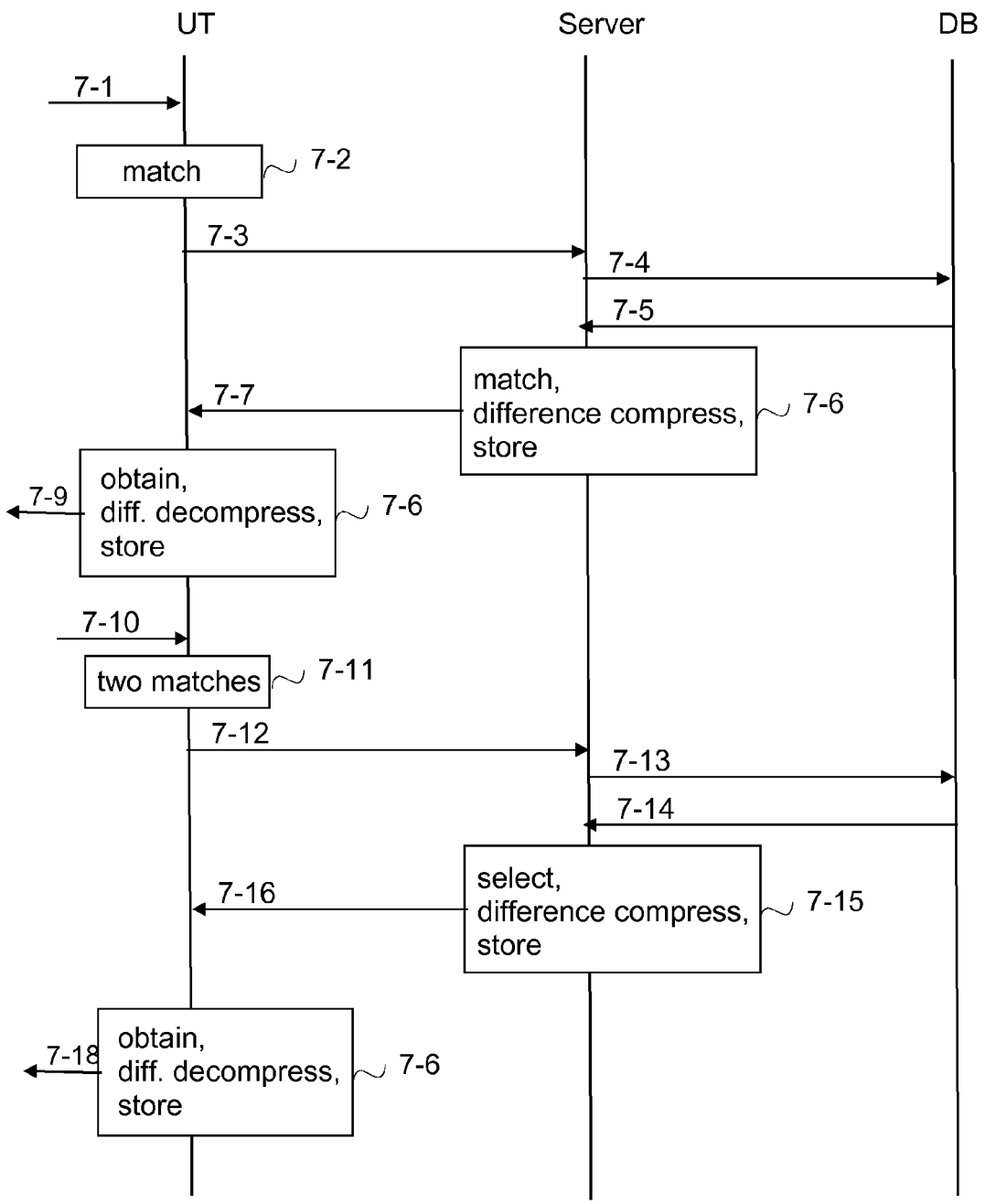

FIG. 7 is a chart illustrating data retrieval according to an embodiment. In the embodiment it is assumed that each query response is stored with time information.

In the example of FIG. 7, it is assumed that a user terminal UT and a server both contain a reference search having identifier A, search definition b1-b7, search results ra, rb, rc, rd, re, rf, rg and time stamp 0:00.

In response to the user terminal receiving search definitions b1-b4 in message 7-1, the user terminal examines reference searches in its memory and finds, in point 7-2, a match, A having time stamp 0:00. Therefore the user terminal sends a query request 7-3 with the search definitions b1-b4 and an identifier of the search reference, i.e. A.

In response to receiving a query request 7-3, the server performs, using the received search definitions, data retrieval from a data storage DB (messages 7-4, 7-5) and obtains in message 7-5 search results, the results being ra, rb', rc and rd.

Then the server examines, in point 7-6, reference searches in the server's memory by using the identifier. One match is found, in point 7-6, and the server difference-compresses, in point 7-6, the retrieved data against the search results in the reference search. Further, the server calculates, in point 7-6, an identifier B and sends the changes, this time an update rb+1 (i.e. the change of rb to rb') with B and new time information 0:20 in a query response 7-7 to the user terminal. The server also stores, in point 7-6, the search as a reference search having identifier B, search definitions b1-b4, search results ra, rb', rc and rd, and time definition 0:20.

When the user terminal receives the query response 7-7, it obtains, in point 7-8, the search results in the reference search waiting for the query response, i.e. reference search A, takes those that are according to search definitions, and updates them, in point 7-8, by performing a difference decompression. This time rb needs to be updated with rb+1, the outcome of the updating being rb'. Then the user terminal sends the search results, i.e. ra, rb', rc, rd, as a response in message 7-9. The server also stores, in point 7-8, the query response content as a reference search having identifier B, search definitions b1-b4, search results ra, rb', rc, rd, and time definition 0:20.

After a while the user terminal receives search definitions b2-b8 in message 7-10, and the user terminal examines reference searches in its memory and finds, in point 7-11, two matches, A having time stamp 0:00, and B having time stamp 0:20. Therefore the user terminal sends a query request 7-12 with the search definitions b2-b8 and identifiers of the search references, i.e. A and B.

In response to receiving the query request 7-12, the server performs, using the received search definitions, data retrieval from a data storage DB (messages 7-13, 7-14) and obtains in message 7-14 search results, the results being rb', rc, rd, re, rf, rg and rh. Then the server examines, in point 7-15, reference searches by using the identifiers A and B and time information. Two matches (A and B) are found and the server selects, in point 7-15, the more recent one (i.e. B), and compares, in point 7-15, the search definitions of the selected reference search B, i.e. b1-b4 with the received search definitions, i.e. b2-b8. The server then defines, in point 7-15 that b2-b4 are difference-compressed against B and difference-compresses, in point 7-15, the retrieved data matching with the defined search definitions against corresponding data in the selected reference search B. This time no updates are found, and only identifier B is added to a query response in point 7-15. Then the server selects, in point 7-15, the remaining match (the older one, i.e. A), compares, in point 7-15, the remaining received search definitions, i.e. b5-b8 with the search definitions of the selected reference search A, i.e. b1-b7, defines, in point 7-15, that b5-b7 are difference-compressed against A, and difference-compresses, in point 7-15, the retrieved data matching with the defined search definitions against corresponding data in the selected reference search. This time no updates are found, and only identifier A is added to a query response in point 7-15. Further, the server detects that the search definition b8 has not been processed, and no usable reference searches are available in the query request. Therefore the server generates an identifier C and compresses, in point 7-15, the retrieved data for b8 and adds the compressed data rh, the identifier C and time information 0:28 to the query response in point 7-15, and then sends the query response 7-18. The server also stores, in point 7-15, a reference search C with the retrieved data (rb', rc, rd, re, rf, rg and rh) and the time stamp 0:28.

When the user terminal receives the query response 7-16, it obtains, in point 7-17, the search results in the reference searches waiting for a query response, i.e. reference searches A and B, takes the more recent one, and takes results for b2-b4, i.e. rb', rc and rd, from reference, search B. Then the user terminal takes results for b5-b7, i.e. re, rf, rg from reference search A, difference-decompresses them with information in the query response 7-16, adds as the outcome (rb', rc, rd, re, rf, rg and rh) to the response message 7-18. The user terminal also stores, in point 7-17, reference search C containing as search results rb', rc, rd, re, rf, rg and rh and 0:28 as the time stamp.

As can be seen from the above, using both A and B instead of A resulted in using less computation capacity and sending less information, since no changes were transmitted. If only A had been used, change rb+1 would have been (re)sent.

In another embodiment, in which a server selects which one of the search references received is to be used, the server may be configured to perform comparisons to obtain a heuristic order of superiority of different search references for specific search definitions. For example, after point 7-15, the server may compare whether a better (i.e. smaller and/or quicker response) result would have been obtained, if A had been used first instead of B, or whether C would have been the best one. This information can be used when b3-b8 is searched next time.

The steps/points, messages and related functions described above in FIGS. 4, 5, 6 and 7 are in no absolute chronological order, and some of the steps/points may be performed simultaneously or in an order differing from the given one. For example, a server may simultaneously obtain data from a database, difference-compress it against a reference search (reference searches) and send the result of the difference compression to the client in a data stream. Correspondingly, the client may simultaneously receive the query response in a data stream, decompress it and provide the search result in a data flow. Other functions can also be executed between the steps/points or within the steps/points and other messages sent between the illustrated messages. Some of the steps/points or part of the steps/points can also be left out or integrated together or replaced by a corresponding step/point or part of the step/point. For example, the compression and decompression of data may be left out. The apparatus operations illustrate a procedure that may be implemented in one or more physical or logical entities. The messages are only exemplary and may even comprise several separate messages for transmitting the same information. In addition, the messages may also contain other information. Further, the messages may be internal information exchange not sent over any network.

Although the invention has been described above assuming that the server generates identifiers, it is apparent for one skilled in the art that the user terminal may also be configured to generate identifiers.

In the above described embodiments, detecting changes and difference-compressing have been described on a general level illustrating what is meant with difference compression. However, it should be appreciated that a technical implementation of the difference compression method may be different from the one described on the general level. For examples if several reference searches are used, the difference compression may take all of them simultaneously as inputs and process them according to rules/implementation of the specific difference compression method. Naturally, the technical implementation depends on the difference compression method used.

The above described embodiments, or different combinations of the above described features forming further embodiments, may be applied to data retrievals in companies having large databases over their different networks, such as an electrical company, gas company, telecommunications company, or in data retrievals when structural models are searched for on a construction site, in an architects' office, in a concrete prefabrication factory, etc.

As is evident from the above, an aspect of the invention comprises storing copies of data on (fairly) cheap media, the copies being stored in the form of a reference search, and utilizing the old, stored copy as much as possible but still providing a data searcher with up-to-date data. Utilizing old copies of data facilitates usage of different searches searching similar data in many alternative ways, especially when the searches are repetitive.

Another aspect of the invention is that difference compression may be performed on a binary representation level, whereby there is no need to understand the data content. However, the invention is as well applicable if a higher understanding level is used.

It will be obvious to a person skilled in the art that, as technology advances, the inventive concept can be implemented in various ways. The invention and its embodiments are not limited to the examples described above but may vary within the scope of the claims.

The invention claimed is:

1. A method for use in a data processing apparatus, the method comprising:
   receiving, in the data processing apparatus, a search request comprising search definitions,
   checking, by the data processing apparatus, by using the search definitions, whether an applicable reference search exists among one or more reference searches stored in a memory, each reference search comprising at least search results,
   in response to an applicable reference search existing, sending from the data processing apparatus, the search definitions and information identifying the reference search towards a data storage over a communication system as a query request,
   receiving, in the data processing apparatus, a query response to the query request, the query response containing changes to the reference search,
   updating, by the data processing apparatus, reference search results with the received changes, and
   sending, by the data processing apparatus, as a response to the search request, the updated search results,
   wherein the updating includes difference decompression.

2. The method of claim 1, further comprising storing the updated search results as a new reference search to the memory.

3. The method of claim 1, wherein the applicable reference search is a reference search having search definitions overlapping the ones received in the search request.

4. The method of claim 1, further comprising:
   finding during checking more than one applicable reference search, and
   sending in the query request information identifying all found reference searches.

5. The method of claim 1, further comprising:
   finding during checking more than one applicable reference search, and
   selecting a predefined number of found reference searches to be identified in the query request.

6. The method of claim 5, wherein the selecting is performed in response to the number of applicable reference searches exceeding a predefined threshold value.

7. A method for use in a data processing apparatus, the method comprising:
   receiving in the data processing apparatus from another data processing apparatus a query request comprising information identifying a reference search and search definitions,
   obtaining, by the data processing apparatus, data from a data storage by using the search definitions,
   checking, by the data processing apparatus, by using the information identifying a reference search, whether a corresponding reference search exists among one or more stored reference searches, each reference search comprising at least search results,
   in response to a corresponding reference search existing,
   detecting changes by comparing, by the data processing apparatus, the obtained data with the reference search's search results, and
   sending from the data processing apparatus detected changes as a query response to the other data processing apparatus,
   wherein detecting the changes is performed by difference compression.

8. The method of claim 7, further comprising storing the obtained data as a new reference search to the data storage.

9. The method of claim 7,
   receiving in the query request information identifying more than one reference search,
   selecting, by the data processing apparatus, according to one or more predefined rules, from the identified reference searches one or more reference searches to be used to detect the changes.

10. The method of claim 7,
    receiving in the query request information identifying more than one reference search,
    detecting the changes for each reference search.

11. The method of claim 7, further comprising evaluating stored reference searches and deleting stored reference searches.

12. A non-transitory computer readable medium embodying thereon a computer program executed by a computer operably coupled to a memory which, when executed performs the method of:
    in response to a search request comprising search definitions, checking, by using the search definitions, whether an applicable reference search exists among one or more reference searches, each reference search comprising at least search results;
    in response to an applicable reference search existing, sending the search definitions and information identifying the reference search towards a data storage as a query request;
    receiving, in the data processing apparatus, a query response to the query request, the query response containing changes to the reference search;
    updating, by the data processing apparatus, reference search results with the received changes; and
    sending, by the data processing apparatus, as a response to the search request, the updated search results,
    wherein the updating includes difference decompression.

13. A non-transitory computer readable medium embodying thereon a computer program executed by a computer operably coupled to a memory which, when executed performs the method of:
    in response to a query request comprising information identifying a reference search and search definitions,
    obtaining data from a data storage by using the search definitions, checking, by using the information identifying a reference search, whether a corresponding reference search exists among one or more stored reference searches, each reference search comprising at least search results, in response to a corresponding reference search existing, detecting changes by comparing the obtained data with the reference search's search results, and sending detected changes as a query response, wherein detecting the changes is performed by difference compression.

14. An apparatus comprising:

memory configured to store at least one reference search, the reference search comprising at least search results;

a data retriever configured to receive a search request comprising search definitions, to check, in response to a search request being received, from the memory by using the search definitions whether an applicable reference search exists, to form a query request, to add, in response to an applicable reference search, information identifying the reference search to the query request; to update, in response to a query response to the query request being received, reference search results with changes received in the query response, the updating including difference decompression, and to send as a response to the search request, the updated search results;

a transmitter configured to send the query request; and a receiver configured to receive the query response.

15. The apparatus of claim 14, wherein the apparatus is one of a server, a user terminal and a work station.

16. A system comprising at least a data storage containing up-to-date data;

a first apparatus configured to store at least one reference search, the reference search comprising at least search results, to receive a search request comprising search definitions, to check, in response to the search request being received, from a memory by using the search definitions whether an applicable reference search exists, to form a query request, to add, in response to an applicable reference search, information identifying the reference search to the query request, to send the query request, receive a query response to the query request, the query response containing changes to the reference search, to update reference search results with the received changes, the updating including difference decompression, and to send as a response to the search request, the updated search results; and a second apparatus configured to store at least one reference search, the reference search comprising at least search results, to receive the query request sent by the first apparatus and comprising information identifying a reference search and search definitions, to access the data storage and retrieve data from the data storage by using the search definitions, to obtain search results of the indicated reference search, to compare the retrieved data with the obtained search results to detect changes by performing difference compression, and to send changes detected during comparison as a query response to the first apparatus.

17. A method for use in a data processing apparatus, the method comprising:

receiving in the data processing apparatus a query request from another data processing apparatus, the query request comprising information identifying a reference search, checking, by the data processing apparatus, by using the information identifying a reference search, whether a corresponding reference search exists among one or more reference searches stored in a memory, each reference search comprising at least search results, in response to a corresponding reference search existing in the memory, obtaining, by the data processing apparatus, data from a data storage by using search definitions of the corresponding reference search, detecting changes by comparing, by the data processing apparatus, the obtained data with the reference search's search results, and sending detected changes as a query response from the data processing apparatus to the other data processing apparatus, wherein detecting the changes is performed by difference compression.

18. A method for use in a data processing apparatus, the method comprising:

receiving, by the data processing apparatus, a search request comprising search definitions, sending the search definitions from the data processing apparatus towards a data storage as a query request, receiving, in the data processing apparatus, a query response to the query request, the query response containing changes to a reference search, checking, by the data processing apparatus, by using the search definitions, whether an applicable reference search exists in a memory among stored one or more reference searches, each reference search comprising at least search results and search definitions, in response to an applicable reference search existing, updating, by the data processing apparatus, reference search results with the received changes, and sending, as a response to the search request, the updated search results, wherein the updating includes difference decompression.

* * * * *